United States Patent [19]
Konovalov et al.

[11] Patent Number: 5,328,586
[45] Date of Patent: Jul. 12, 1994

[54] PROCESS FOR THE MANUFACTURE OF LEAD-ACID BATTERY ELECTRODE AND LEAD-ACID STORAGE BATTERY

[75] Inventors: Mikhail B. Konovalov; Vladislav N. Demin; Oleg N. Demin, all of Kursk, Russian Federation

[73] Assignee: Gorodskoi Studenchesko-Molodezhny Tsentr "Praktika", Kursk, Russian Federation

[21] Appl. No.: 964,627

[22] Filed: Oct. 22, 1992

[30] Foreign Application Priority Data

| Oct. 22, 1991 | [SU] | U.S.S.R. | 5006061 |
| Dec. 10, 1991 | [SU] | U.S.S.R. | 5016449 |
| Mar. 2, 1992 | [RU] | Russian Federation | 5038415 |
| Apr. 2, 1992 | [RU] | Russian Federation | 5035595 |

[51] Int. Cl.$^5$ ............................................. H01M 4/16
[52] U.S. Cl. ................................... 205/63; 429/140; 429/228
[58] Field of Search .................... 429/140, 66, 228; 205/63

[56] References Cited

U.S. PATENT DOCUMENTS

| 1,510,617 | 10/1924 | Vare | 429/66 |
| 1,660,264 | 2/1928 | Garlock | 205/63 |
| 3,207,632 | 9/1965 | Dickover et al. | 429/66 |
| 4,140,589 | 2/1979 | Hradcovsky et al. | 205/63 |
| 4,546,053 | 10/1985 | Sundberg | 429/140 X |
| 4,656,706 | 4/1987 | Mahato et al. | 205/63 X |

OTHER PUBLICATIONS

Storage Batteries, George W. Vinal, John Wiley & Sons, Inc., New York, Fourth Edition, 1955, pp. 46–51.

*Primary Examiner*—Stephen Kalafut
*Attorney, Agent, or Firm*—Keck, Mahin & Cate

[57] ABSTRACT

A process for the manufacture of an electrode for lead-acid storage battery wherein a current-conducting backing is subjected to electrochemical treatment, to produce an active material. Said active material is formed from the outer layer of the current-conducting backing. The active material is subjected to compression by applying a pressure to the surface thereof.

13 Claims, 7 Drawing Sheets

PROCESS FOR THE MANUFACTURE OF LEAD-ACID BATTERY ELECTRODE AND LEAD-ACID STORAGE BATTERY

FIELD OF THE INVENTION

This invention relates to the electrochemical industry, specifically to the process of manufacture of lead-acid storage battery electrode and a lead-acid storage battery, wherein this electrode is used.

The present invention can be beneficial in the manufacture of lead-acid storage batteries, for instance, used as power supply in radio engineering and household appliances including receivers, players, tape recorders, mixers, coffee grinders, hand tools, toys.

Further, the present invention can also be most advantageously used in the lead-acid storage batteries used in vehicles, such as accumulator cars, battery-driven vehicles, also storage batteries used as emergency power supply at power stations, ships, including batteries not requiring periodic topping up with distilled water throughout the whole service life of the storage battery.

BACKGROUND OF THE INVENTION

Although lead-acid storage batteries are the most widespread among the currently used secondary chemical power sources and the demand is continuously increasing, said batteries rank below the novel batteries of other types in some of the parameters.

This situation justifies the need for increasing the specific power characteristics of lead-acid cells, cutting the rate of lead usage and production expenses, improving the ecology of the production processes.

Attempts to enchance the power characteristics of lead-acid storage battery have lead to the development of a new process for the manufacture of electrodes (see: George Wood Vinal, Sc.D., "Storage Batteries", 1955, New York, John Wiley and Sons, Inc., London, Chapman & Hall, Ltd., Fourth Edition, pp. 27–46).

A process known in the art comprises coating a current-conducting backing in the form of a grid made of lead or an alloy of same with a paste prepared from a lead powder, sulfuric acid and water, said coating being achieved using any known method. The grid coated with said paste forms a plate which is subsequently placed in an electrolytic bath and subjected to an electrochemical treatment, as a result of said treatment said paste is converted into an active material, comprising essentially $PbO_2$ in the positive electrode and lead sponge in the negative electrode.

Said production process is responsible for impairing the ecological conditions of the environment and increasing production expenditures owing to the use of lead powder.

Known in the art is a process for manufacturing lead-acid cell storage battery electrode, which improves the ecological conditions at the production site (see: George Wood Vinal, Sc. D., "Storage Batteries", 1955, New York, John Wiley & Sons, Inc., London, Chapman & Hall, Ltd., Fourth Edition, p. 46–51).

Said process comprises building a layer of active material, essentially $PbO_2$, on a current-conducting backing which is a lead plate having a developed surface. The active material is formed from the surface layer of the current-conducting backing by subjecting it to an electrochemical treatment by which is herein understood a process occuring when an electric current is passed through the current-conducting backing, electrolyte and an auxiliary electrode with a polarity opposite to that of the backing, this process being accompanied by a series of chemical changes as a result of electric energy being converted into chemical energy.

The electrode manufactured according to the art known process offers a low specific power capacity which is caused by internal high resistance owing to internal stresses developing in the active material.

The reason for the phenomena lies in that the formation of the active material is accompanied by its swelling because the specific volume of the active material is about 3.5 times larger than that of the lead and tends to spread in all directions. Hereupon, the adjacent sites of the newly formed active material at the boundary between the active material and the current-conducting layer exert mutual pressure which gives rise to internal stresses that tend to break the active material from the current-conducting backing.

It leads to the appearance of defects in the layer structure, i.e. cracks, delaminations, and swelling of the active material, and gives rise to the increase of inner resistance of the active material and the decrease of utilisation factor thereof. As a result the specific capacitance characteristics of the electrode come down.

These disadvantages are especially obvious if the thickness of the active material layer exceeds 0.3 mm and happen preferably on curved, particularly concave sections of the current-conducting backing.

Moreover, the manufacture of such electrodes involves a large quantity of lead because of the massive conducting backing which is required in order to ensure a reasonable long service life of batteries and to prevent warping of the electrode during the manufacture. This results in increased production expenditures. Upon application of the electrodes manufactured by the above mentioned method, in the lead-acid storage batteries, such electrodes display poor specific power characteristics due to the large weight of the current-conducting backing and the disadvantages of the active material noted above. Storage batteries employing such electrodes are not suitable as traction batteries in accumulator cars, battery driven vehicles, nor as batteries operated under multiple charge-discharge conditions.

SUMMARY OF THE INVENTION

The object of this invention is to provide a process for manufacturing a lead-acid storage battery electrode, which permit to avoid the influence of inner stresses occurring in the active material in the course of its formation onto the structure of the active material layer, and to obtain an electrode having super specific power characteristics.

Still another object of this invention is to provide the improvement of the ecological conditions in the production of electrodes.

One more object of this invention consists in the decrease of specific consumption of lead, and consequently, decrease of the production costs.

Another object of this invention is to provide a lead-acid storage battery having increased power capacity under multiple charge-discharge conditions, the claimed electrode being used therein.

The above object is achieved by the process of manufacturing lead-acid storage battery electrode which comprises passing an electric current through the current-conducting lead backing immersed into electrolyte and connected to the positive power source, as a result of the electrochemical reaction active material is formed which essentially consists of $PbO_2$, and subsequently from the outer layer of the current conducting backing the layer of active material is formed, the thickness of the active material exceeds that of the outer layer of the current-conducting backing.

According to the invention the current-conducting backing of lead is placed between the layer of corrosion-resistant porous material, these layers in the course of active material formation on the current-conducting backing create pressure onto the surface of the formed layer ranging from 0.005 to 6.5 MPa, and the electrochemical treatment is carried out until the thickness of active material layer reaches 0.3 to 5 mm.

It is feasible to place the current-conducting backing of lead with a gap between the layers of the corrosion-resistant porous material, forming in this gap a layer of active material until obtaining contact with the layers of corrosion-resistant porous material, which in the process of active material forming on the current-conducting backing and upon reaching the contact exert pressure onto the surface of the formed layer ranging from 0.005 to 5.5 MPa.

It is useful to discontact the resultant electrode from the positive terminal of the power supply and to contact it to the negative terminal, passing electric current afterwards for reconstruction of the active material to sponge lead.

It is feasible to pass electric current until the electrode potential reaches $+0.2$ to $-0.4$ V in relation to the comparison cadmium electrode.

Also it is feasible to make use of the corrosion-resistant porous material with pore dimensions ranging from 0.1 $\mu$m to 800 $\mu$m.

It is also useful to make at least one of the layers of corrosion-resistant porous material which has the tendency to resilient deformation upon pressing, the rate of relative deformation of the layer upon compressing being from 4.0 to 95%.

It is feasible also to connect the layers of the corrosion-resistant porous material is such a way as to form a casing to house the current-conducting backing.

It is useful to use elastic casing which resiliently deforms upon stretching, the rate of relative deformation upon casing stretching amounts to more than 5%.

It is advantageous to make the casing of a working part and a stand-by part, locating the current-conductive backing in the working part; the working part and the stand-by one are connected in such a way that upon active material layer formation along the layer thickness increase the working part of the casing increased, and the stand-by one decreased, the rate of relative deformation upon working part stretch being more than 5%.

It is feasible to use a shock absorber made of resilient corrosion-resistant material and locate it in the stand-by section of the casing.

It is also useful to use hollow current-conductive backing.

It is advantageous to locate in the hollow space of the current-conductive backing a shock absorber made of resilient corrosion-resistant material.

It is also feasible to make the reaction of corrosion-resistant porous material layer surface impregnatable for the electrolyte to form various thicknesses of the active material layer being built on the current-conductive backing surface.

This is achieved by the procedure when in the lead-acid storage battery comprising a frame wherein a block of electrodes is located, which contains at least one positive electrode and at least one negative electrode, each of them having a current outlet tightly passing through the frame cover.

According to the invention at least one of the electrodes is made as per the process disclosed and comprises a casing of corrosion-resistant porous material which is in resilient-deformed condition, a current conducting backing, located in the said casing and electrically connected to the current outlet, and the active material located between the casing and the current-conducting backing.

The rate of pressure in the above noted interval at 0.005–6.6 MPa significantly esceeds the specific capacity characteristics of the electrode and, consequently, increases specific power indices of the storage batteries as a whole.

DESCRIPTION OF THE DRAWINGS

Further the invention is illustrated by actual embodiments thereof with appropriate references to the accompanying drawings, in which:

FIG. 10$b$ - is a view similar to FIG. 10$a$, showing the casing in contracted state, according to the invention;

FIG. 15 is a cross-sectional view showing the stand-by and the working sections of the casing with a shock absorber located in the stand-by section, according to the invention;

DETAILED DESCRIPTION OF THE PREFERRED EMBODIMENTS

The process of electrode manufacture comprises the following steps.

Figure 1:
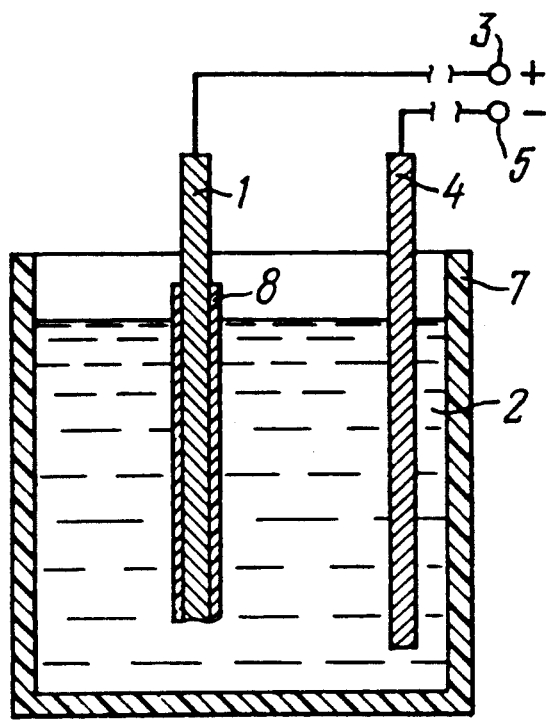
FIG. 1 is a schematic cross sectional view of the apparatus for implementing the process of manufacturing lead-acid storage battery electrode before the beginning of active material formation process.
Figure 2:
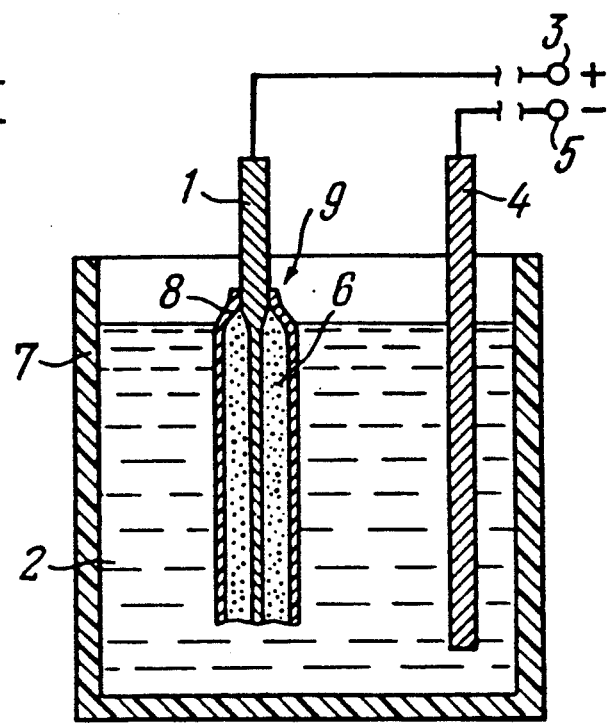
FIG. 2 is a schematic cross-sectional view of the apparatus for implementation of the process of manufacturing lead-acid storage battery electrode in the course of active material formation, according to the invention.

Electric current is passed through the current-conductive backing 1 (FIG. 1) of lead, immersed in electrolyte 2 and connected to positive terminal 3 of power supply and via technological electrode 4 contacted to positive terminal 5 of current supply. On the surface of current-conductive backing 1 as a result of electrochemical reaction active material 6 is formed (FIG. 2) of positive electrode, essentially consisting of $PbO_2$ $$Pb + 2H_2O - 4e \rightarrow PbO_2 + 4H^+$$

Current-conductive backing 1, electrolyte 2 and technological electrode 4 are placed in container 7.

Layer of active material 6 is formed out of the outer layer of current-conductive backing 1. Hereupon thickness of active material 6 exceeds that of the outer layer of current-conductive backing 1.

Current conductive backing 1 of lead is placed between layers 8 of corrosion resistant porous material.

In the course of active material 6 forming layers 8 create pressure onto the surface of the formed layer of active material 6 ranging from 0.005 to 6.5 MPa. Electrochemical treatment is continued until thickness of active material 6 reaches 0.3 to 6 mm. As a result electrode 9 is obtained.

Container 7 is normally made of ebonite and filled with the electrolyte of the following composition: sulfuric acid solution of 1.05–1.15 density. Sometimes electrolyte contains neutral sulfates and alkalis. Moreover, known in the art is a hyposulfite method of forming in a solution, containing sodium hyposulfite $Na_2S_2O_3$, sodium sulfate $Na_2SO_4$ and sodium nitrate $Na_2NO_3$.

Figure 3:
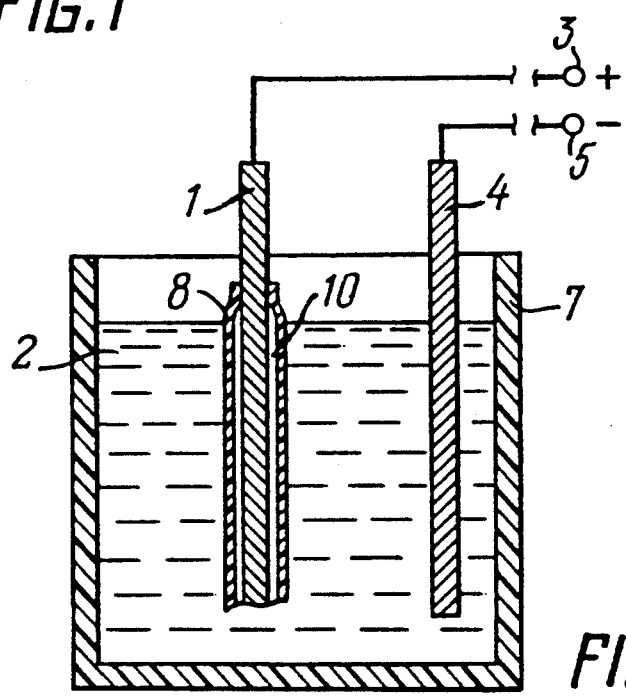
FIG. 3 is a schematic cross-sectional view of the apparatus for implementation of the process of manufacturing lead-acid storage battery electrode, when the current-conductive backing is located with a gap between layers of corrosion-resistant porous material, according to the invention.

Another version of embodiment of the process for manufacturing lead-acid storage battery electrode is characterized in that the current-conductive lead backing 1 is arranged with a gap 10 (FIG. 3) between layer 8 of corrosion-resistant porous material. In gap 10 a layer of active material 6 is formed until reaching the contact with layers 8 of the corrosion-resistant porous material. Hereupon, the process is realized without pressure onto the surface of the formed layer of active material 6. After reaching the contact of the layers the process continues according to the method disclosed above, i.e. a pressure of from 0.005 to 6.5 MPa is created on the surface of the formed layer.

Figure 4:
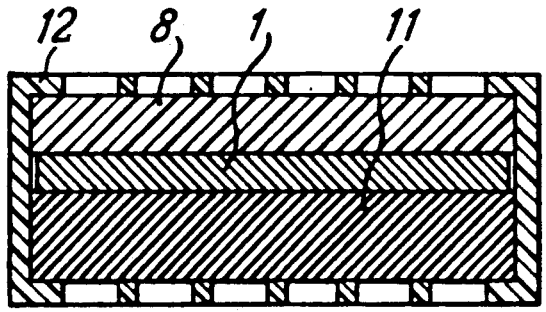
FIG. 4 is a cross-sectional view of the current-conductive backing located between the layers of corrosion-resistant porous material before the beginning of active material formation process, according to the invention.

Current-conductive backing 1 (FIG. 4) is placed between layers 8 of corrosion-resistant porous material, at least one of the layers - 11 - resiliently deforms upon compression. The rate of relative deformation amounts to 4–95%.

Figure 5:
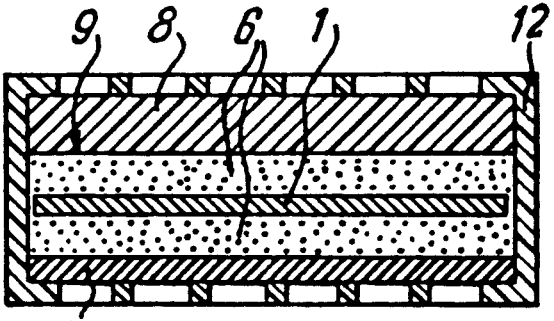
FIG. 5 - is a view similar to FIG. 4 showing active material formation, according to the invention.

This layer is made of expanded polypropylene, porous rubber and other resilient materials with open pores. Current-conducting backing 1 and layer 8 are placed in housing 12. Upon formation of active material 6 (FIG. 5) the volume of electrode 9 increases, layer 11 contracts exerting pressure onto the surface of the formed layer of active material 6.

Figure 6:
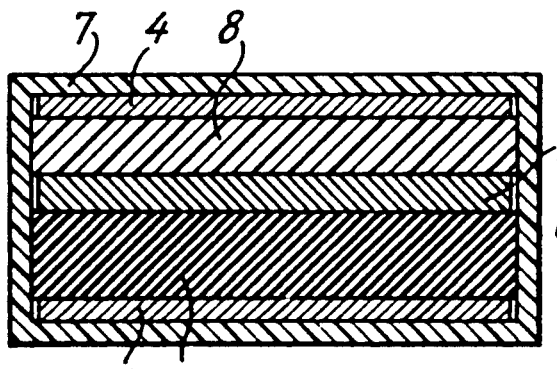
FIG. 6 - is a view similar to FIG. 4, but located in the container between technological electrodes, according to the invention.
Figure 7:
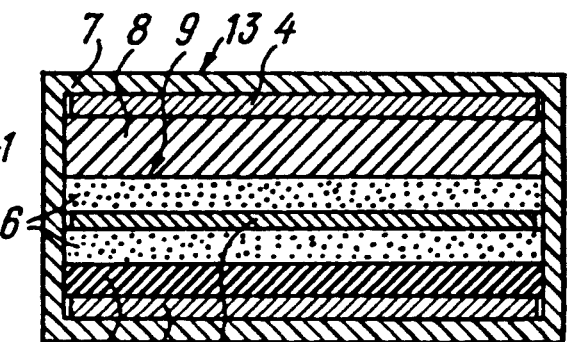
FIG. 7 - is a view similar to FIG. 6 active material formation, according to the invention.

Possible is a version of embodiment of the method, when current-conductive backing 1 (FIG. 6) is placed between layers 8 which in turn are placed between technological electrodes 4 located in container 7. This method is intended for formation of storage battery electrodes, when after formation of active material 6 (FIG. 7) on current-conductive backing 1 electrode 9 is not removed from container 8. Container 7 with electrodes 4, 9 in this case represents storage battery 13.

Figure 8:
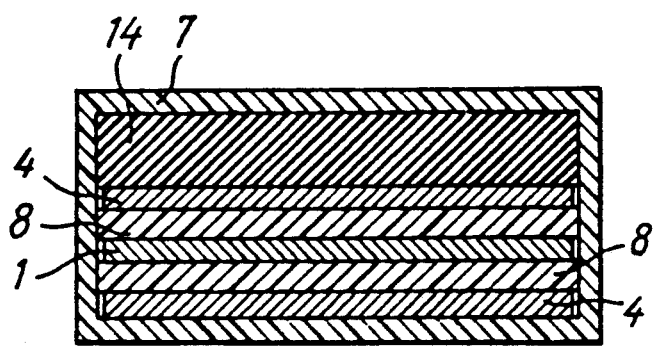
FIG. 8 - is a view similar FIG. 6, but showing an additional layer of the material having resilient properties, according to the invention.

One more version of embodiment is possible, when current-conductive backing 1 (FIG. 8) is placed in container 7 between layers 8 which have no resilient properties upon compression. In this case into container 7 additional layer 4 is placed, this layer is of material having resilient properties upon compression, for instance, rubber, polyurethane.

According to the claimed method it is possible to manufacture also negative electrodes of lead-acid storage battery.

For this purpose upon completion of the reaction, i.e. after attaining the required thickness of the layer from 0.3 to 5 mm electrode 9 (FIG. 2) was disconnected from positive terminal 3 of the power supply and connected to the negative terminal 5. Accordingly, technological electrode 4 is re-connected. After that electric current was passed until electrode potential reaches the range of from +0.2 to −0.4 V relative to the comparison electrode. Cadmium electrode was used as the comparison electrode in the disclosed version. Active material 6 was reduced to sponge lead according to the following reaction:

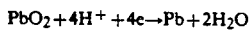

$$PbO_2 + 4H^+ + 4e \rightarrow Pb + 2H_2O$$

Corrosion-resistant porous material with pore dimensions from 0.1 m$\mu$m to 800 m$\mu$m was used. The above pore dimension was adopted on the assumption that pore size less than 0.1 m$\mu$m prevents normal diffusion of the electrolyte, while with pore size more than 800 $\mu$m the active material being formed under the created pressure passes through the pores beyond the layer.

The most preferable embodiment of the method is the one when the layers of the corrosion resistant porous material are combined in a closed casing wherein current-conductive backing is placed. After electrochemical treating electrode 9 of round cross-section was obtained.

Figure 9:
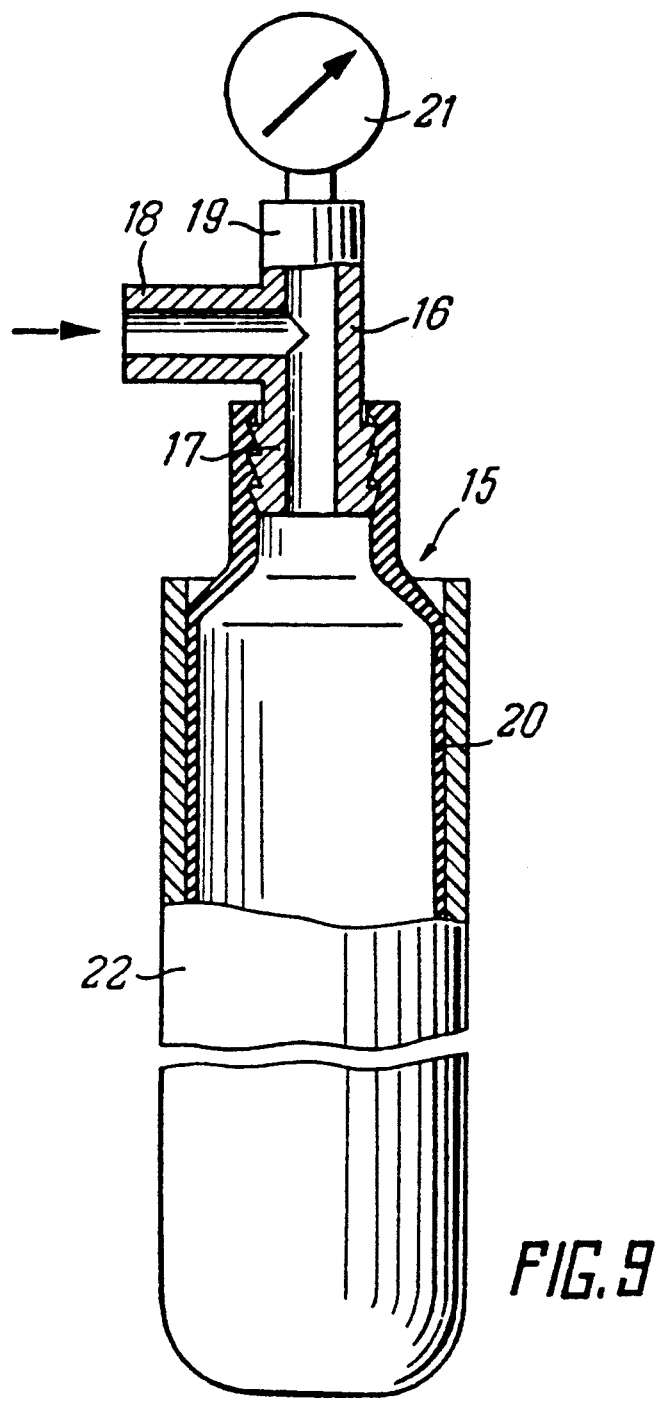
FIG. 9 shows an apparatus for determining the pressure created upon implementation of the process for manufacturing lead-acid storage battery electrode (partial cut-out), according to the invention.

For determining the rate of pressure exerted onto active material 6 by layers 8, apparatus 15 was used which is shown in FIG. 9. The apparatus comprises T-joint 16 with branch pipes 17, 18, 19. On branch 17 balloon 20 is hermetically arranged, the balloon is made of thin rubber. Branch pipe 18 is connected with a compressor (not shown in the Figures), and branch pipe 19 - with gauge meter 21. Firstly, diameter of the obtained electrode 9 was measured, then calibrating casing 22 was used, this casing being similar to that which was used in manufacturing electrode 8. Into this casing balloon 20 was placed and the compressor was started. Diameter changes were checked, and the compressor was disconnected upon attaining the diameter of the calibrating casing 22 equalling the diameter of electrode 9. From readings of gauge 21 the rate of pressure was determined, it was assumed to be equal to the rate of the pressure created upon formation of electrode 9.

Different types of casings are used.

Figure 10A:
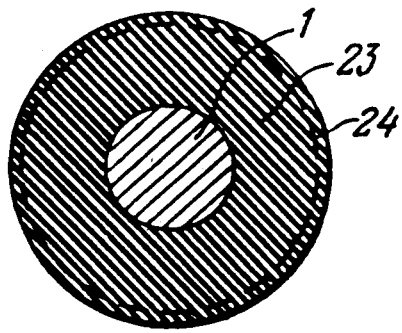
FIG. 10 is a variant of implementation of a closed casing which contracts in the course of active material formation (cross section), according to the invention.

One of the alternatives represents casing 23 (FIG. 10a) made of corrosion-resistant porous material, which resiliently deforms upon compression. Hereupon, specific deformation rate upon compression of the casing 23 wall is 4–95%. The materials for the casings are: expanded polypropylene, expanded polyurethane, porous rubber,—i.e. the materials with open pores, which may be reinforced over the outer surface for imparing tensile strength to corrosion-resistant threads of Lavsan, polypropylene.

Figure 10B:
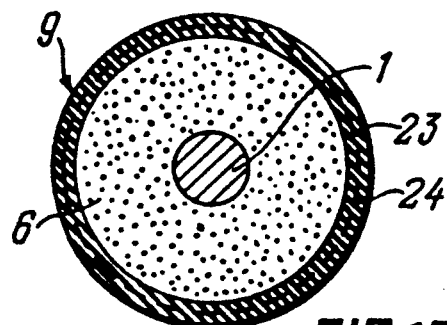

FIG. 10b shows a version of casing 23 in contracted condition, hereupon the outer diameter is not changed. The reinforcement threads 24 pass close to the outer surface of casing 23 and are marked in a broken line.

Figure 11A:
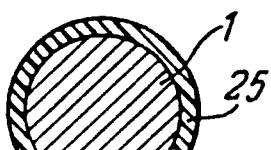
FIG. 11$a$ is a cross-sectional view showing implementation of a closed casing which stretches in the course of active material formation, according to the invention.
FIG. 11b - is a view similar to FIG. 11a, showing the casing in stretched condition, according to the invention.

It is possible to employ the alternative with casing 25 (FIG. 11a), which resiliently deforms upon stretching, the rate of specific deformation in this case exceeds 5%.

Resilient stretching of the casing may be attained by:

using non-woven material which has resilient properties, for instance, expanded polyurethane, expanded polypropylene, or porous rubber;

making fabric casing with the use of the threads which have resilient features, such as latex threads, threads of spendexapolyurethane. Hereupon, their weave type in the casing may be not resilient, for instance, linen weave, twill weave or satin weave;

obtaining certain type of weaves having resilient properties, such as loop weave, elastic and derivatives thereof, satin-stich, but the threads have no resilient properties;

obtaining various combinations in joining together in one casing the threads which have resilient properties with the threads which have not resilient properties, also be alternating in one casing different weaves of threads, which have resilient properties with those which have not.

Figure 11B:
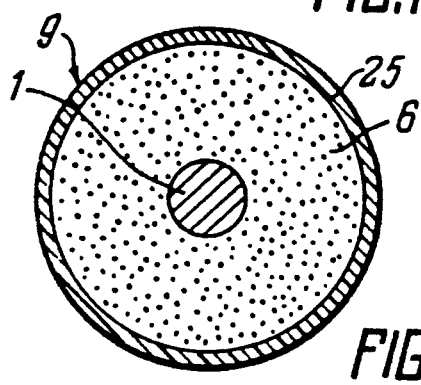

FIG. 11b shows a version of casing 25 which in the course of active material 6 formation is expanded, i.e. its outer diameter increases.

Figure 12A:
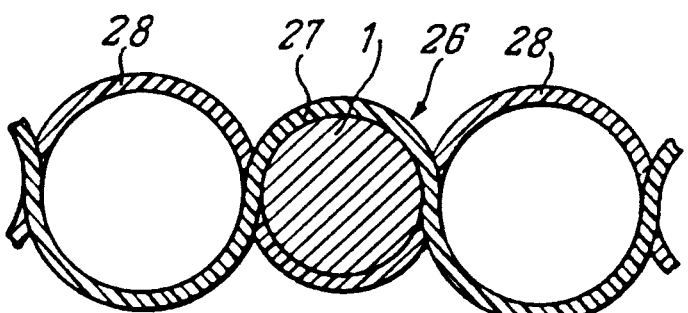
FIG. 12a - is a cross-sectional view showing a version of implementation of a casing closed consisting of a working and a stand-by sections, according to the invention.

There is one more version of embodiment of the method, when casing 26 (FIG. 12a) is made of two sections: working 27 and stand-by 28. Hereupon the current-conducting backing 1 is located in the working section 27.

Working section 27 and stand-by section 28 of casing 26 are connected in such a way that upon formation of active material layer 6 (FIG. 12c) working section 27 of the casing increases, while the stand-by section 28 decreases. The rate of relative deformation upon working section stretch exceeds 5%.

Figure 12B:
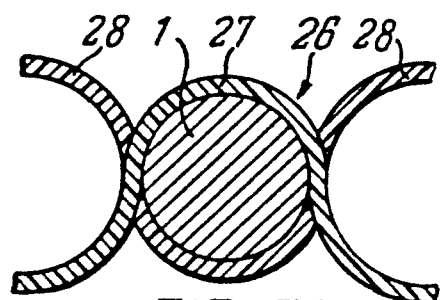
FIG. 12b - is a view similar to FIG. 12a, but showing a closed working section and an open stand-by section, according to the invention.
Figure 12C:
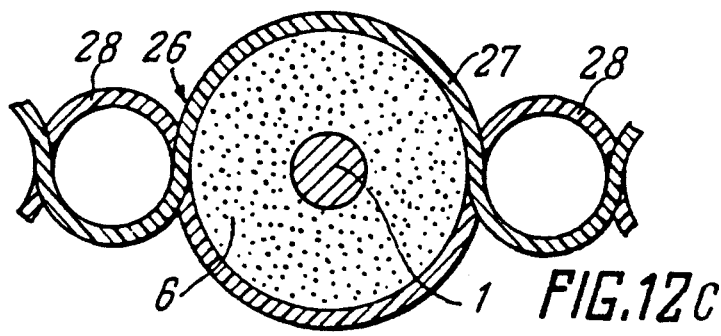
FIG. 12c - is a view similar to FIG. 12a, but with stretched working section upon formation of the active material and open stand-by section, according to the invention.

In the disclosed version the casing is made of double layer fabric with transient layers, for instance, of Lavsan or polypropylene. The stand-by section 28 may be made as closed (FIG. 12a), and as open (FIG. 12b).

Figure 13:
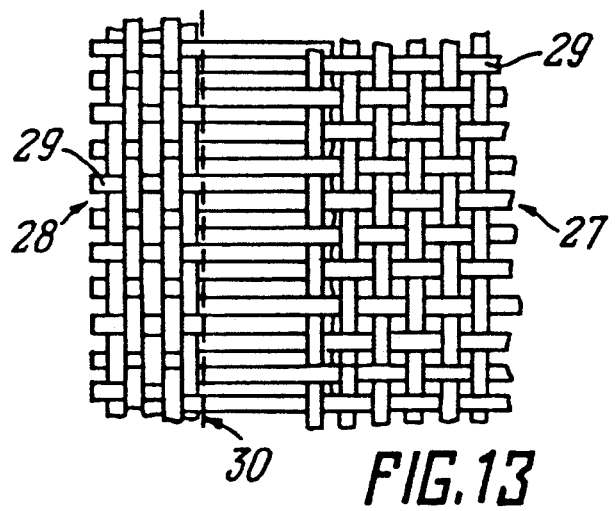
FIG. 13 shows a schematic plan view of piece of cloth fabric out of which the casing is made, according to the invention.

In the fabric of casing 26 (FIG. 13) weft threads are movable lengthwise, i.e. perpendicular to line 30 of layers transition. In the course of active material 6 formation and increase of electrode 9 volume, working section 27 of the casing increases in volume, while the stand-by 28 - decreases. Upon this the weft threads 29 shift relative to line 30 of layers transition and increase the perimeter of walls in working section 27 of casing 26, simultaneously they decrease perimeter of walls in the stand-by section 28 of the casing, this leads to the increase of thread density in weft in the stand-by section 28. Thread transition takes place with the resistance on the part of the fabric.

Along with active material thickness increase the pressure from casing 26 onto the formed layer of active material also increases.

Possible is a version, when casing 31 (FIG. 14a) is made of a single layer fabric, and formation of working section 27 and of the stand-by section 28 is effected with the help of an auxiliary element, for instance, clamp 32, which pinches the casing dividing it into a working zone 27 and a stand-by section 28.

Figures 14A, 14B:
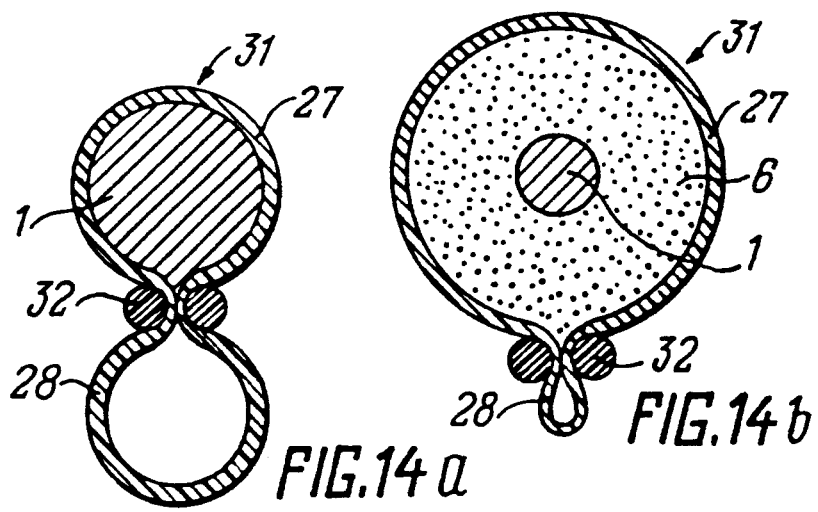
FIG. 14a is a cross-sectional view showing implementation of the casing out of a single-layer fabric, wherein the working and the stand-by sections are made by a clamp, according to the invention.
FIG. 14b - is a view similar to FIG. 14a, but in the course of active material formation, according to the invention.

FIG. 14a shows the casing before the beginning of the process of active materiale 6 formation, and FIG. 14b - in the course of active material formation.

Figures 15A, 15B:
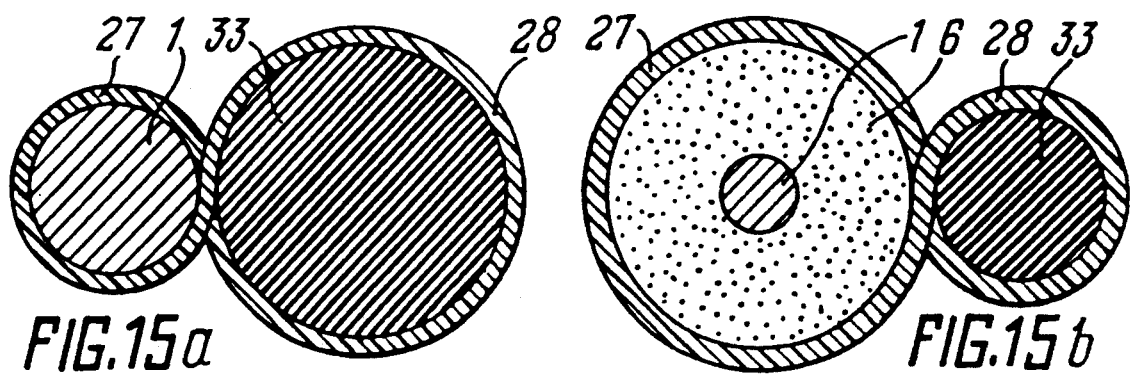
FIG. 15b - is a view similar to FIG. 15a, but in the course of active material layer formation, according to the invention.

According to one of the embodiments of the method shock-absorber 33 (FIG. 15a) is used, it is located in stand-by section 28 of the casing. Upon formation of active material the volume of working section 27 increases and the volume of the stand-by section 28 decreases. Shock absorber 33 prevents the decrease of volume in stand-by section 28, creating additional pressure on the surface of the formed layer of active material 6. The shock absorber 33, as a rule, is made of rubber, porous rubber, polyurethane or expanded polyurethane, i.e. of the material which has the rate of relative deformation upon compression from 4 to 95%.

Figure 16A:
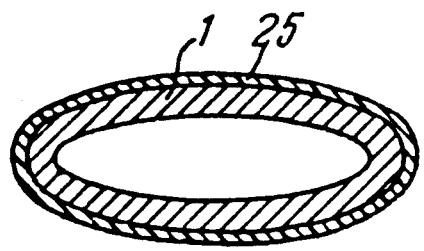
FIG. 16a - is a cross-sectional view showing complete current-conductive backing of lead placed in the casing, according to the invention.
Figure 16B:
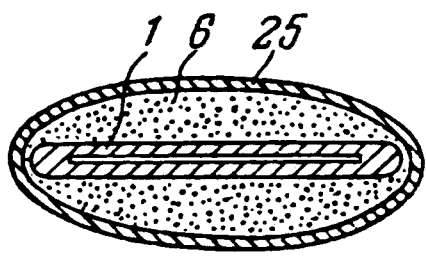
FIG. 16b - is a cross-sectional view showing a FIG. 16a, but in the course of active material formation, according to the invention.
Figure 17B:
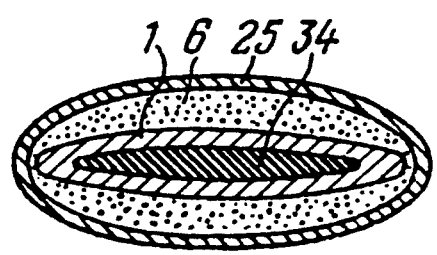
FIG. 17b - is a view similar to FIG. 17a, but in the course of active material formation, according to the invention.

Possible is a version, when hollow current-conductive backing 1 is used (FIG. 16a). Upon formation of active material 6 on the surface of the current-conducting backing 1 (FIG. 16b), the active material interacts with the walls of casing 25, from which appears the reaction force passing onto active material 6 and current-conductive backing 1. Under the influence of these forces and upon permanent increase of the volume in active material 6 current-conductive backing 1 contracts, and simultaneously the volume of the space inside current-conductive backing decreases.

Figure 17A:
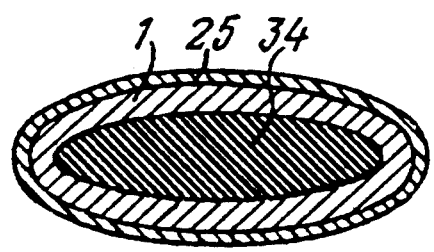
FIG. 17a - is a cross-sectional view showing a hollow current-conductive backing of lead with a shock absorber in it, according to the invention.

It is feasible in the hollow space of the current-conductive backing 1 to place shock absorber 34 (FIG. 17a, b) similar the shock absorber 33.

Sometimes the section of corrosion-resistant porous material layer is made impermeable for electrolyte for the formation of different thicknesses of active material layers.

Figure 18A:
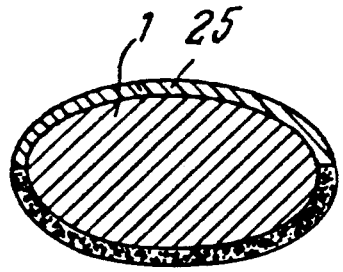
FIG. 18a - is a cross-sectional view showing current-conductive backing in the casing, a portion of which is made impermeable for electrolyte, according to the invention.

FIG. 18a shows current-conductive backing 1 with casing 25, the part of which marked with continuous black line, is impermeable for electrolyte.

Figure 18B:
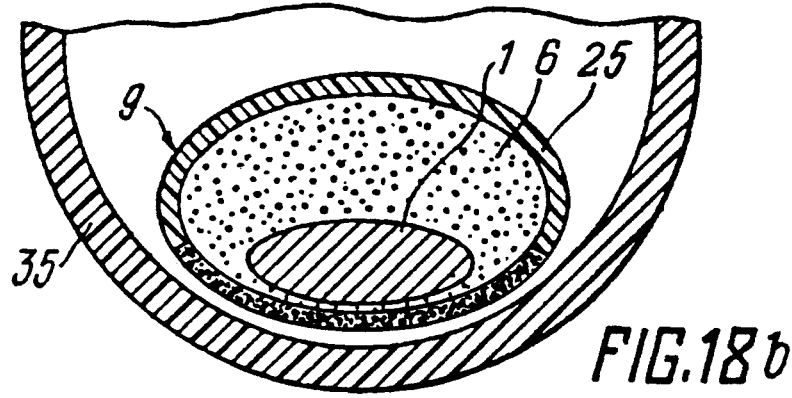
FIG. 18b - is a view similar to FIG. 18a, but after formation of the active material, according to the invention.

FIG. 18b shows current-conductive backing 1 after the formation of active material 6.

On the current-conductive backing 1 on the side facing the impermeable part of casing 25 active material 6 practically is not formed. Such distribution of active material 6 is feasible in the manufacture of electrodes 9 arranged near the walls 35 of the storage battery.

Figure 19:
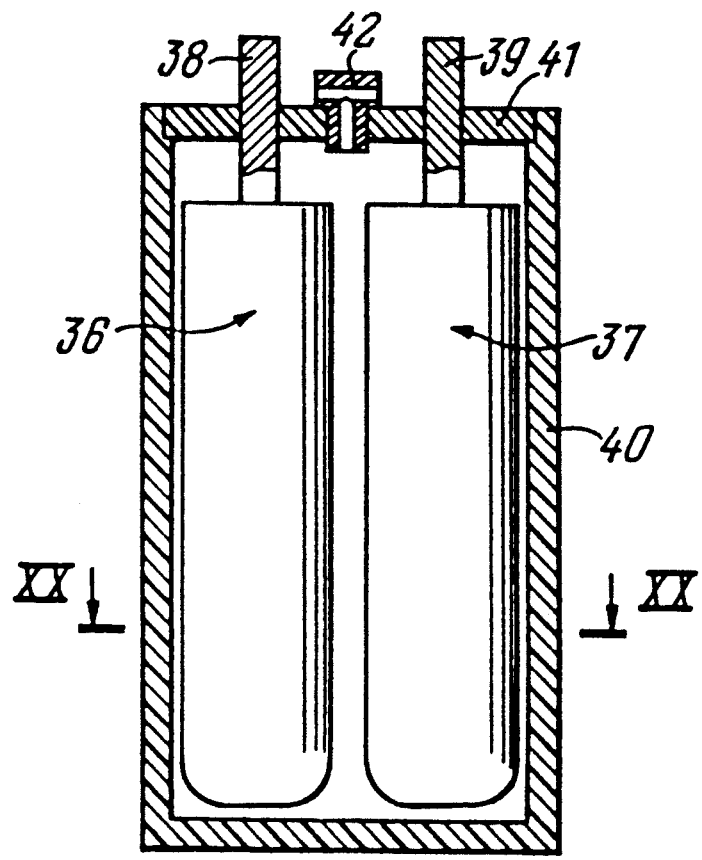
FIG. 19 is a cross sectional view showing lead-acid storage battery, the electrodes of which are manufactured by the claimed method, according to the invention.

Lead-acid storage battery, according to the invention, comprises in the disclosed version one positive electrode 36 (FIG. 19) and one negative electrode 37, each of them being provided with current outlets 38 and 39 respectively.

Electrodes 36 and 37 are arranged inside frame 40. Current outlets 38 and 39 tightly pass through lid 41 of frame 40. Ventilation valve 42 for gas discharge is provided on lid 41.

Figure 20:
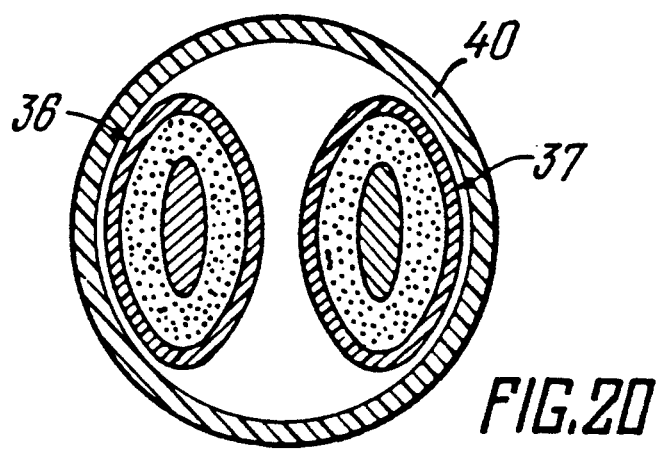
FIG. 20 - is a cross section along line XX—XX of FIG. 19, according to the invention.

FIG. 20 shows lead-acid storage battery in cross-section. In the disclosed version casings of electrodes 36, 37 do not comprise sections which are impermeable for electrolyte.

Upon selection of the type of casing and layers of corrosion-resistant porous material and upon determining required rate of their relative deformation one must be guided by the requirements to the electrodes and conditions of operation thereof.

Properly accounted for is the required thickness of active material layer, which may alter from 0.3 to 5.00 mm and which is selected depending on the type of the storage battery wherein the electrode is going to be used. For instance, in stationary storage batteries the thickness of active material layer exceeds that of the starter storage batteries.

Taken into account is the required estimated relative expansion of the casing after completion of active material formation.

Taken into account is the required value of relative compression rate in the layer of corrosion-resistant porous separator after completion of active material formation.

Taken into account in the presence of preliminary stretch of the casing, i.e. when the original size of the working section of the casing is less than the size of current-conductive backing, which is used for selection of optimum pressure created by the casing onto the active material.

All these recommendations are taken into account upon formation of the layers so that relative deformation thereof upon extension might exceed 5%, and relative deformation upon contraction—from 4 to 95%.

Values less than 5% upon stretching do not provide required extension of the casing upon formation of active material and creation of pressure on the surface thereof.

Values higher than 5% upon stretching and upon retaining pore size in the material within the range of 0.1 to 800 μm and the force created by the layers within the range of from 0.005 to 6 MPa provide the creation of pressure on the surface of the active material within a wide range of electrode dimensions.

Values below 4% upon contraction of the layer do not provide required contraction of the layer upon formation of the active material and creation of pressure on the surface thereof.

Values higher than 95% upon contraction of the layer lead to over-packing of the layer thus preventing normal diffusion of the electrolyte through the layer and increasing electrical resistance of the layer.

Below an example of embodiment of the method is given for the manufacture of positive and negative electrodes of lead-acid storage battery. Current-conductive backing 1 (FIG. 12a) in the shape of a rod (diameter 5.0 mm and length 60 mm) is placed in the working section 27 of casing 26 made of Lavsan double-layer fabric with transient layers. At the two sides of working section 27 stand-by sections 28 are arranged. Current-conductive backing 1 (FIG. 1) and technological electrode 4 are placed in container 7 with electrolyte, which is the solution of sulfuric acid of 1.07 g/cm$^3$ density and sodium perchlorate 10 g/l. Current-conductive backing 1 is connected to positive terminal 3 of the power supply, and the technological electrode 4—to the negative terminal 5. Then electric current is plassed through current-conductive backing 1, electrolyte 2 and technological electrode 4. As a result of anode oxidation of the surface of current-conductive backing 1 a layer of active material 6 (FIG. 12c) is formed, according to the following electro chemical reaction:

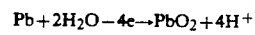

$$Pb + 2H_2O - 4e \rightarrow PbO_2 + 4H^+$$

This process is conducted at the current density of 1.5 A/dm$^2$ for 24 hours.

The formation of active material 6 is accompanied by the increase of volume thereof due to the fact that specific volume of the active material 6 approximately is 3.5 times bigger than that of the lead, and its tendency to expand in all directions.

Hereupon, on the boundary current-conductive backing - active material 6 the adjacent sections of the newly formed active material 6 exert mutual pressure resulting in appearance of inner stresses trying to break active material 6 away from the current-conductive backing 1.

Upon transformation of the outer layer of the current-conductive backing 1 into active material 6, the latter while increasing in volume presses the wall of working section 27 of casing 26. Upon this the counter pressure exerted by casing 26 affects the active material 6. Weft threads 29 shift in respect of the line of layers transition 30 on account of stand-by sections 28 being present, this permits to create pressure onto the surface of active material 5 within wide range of electrode dimensions.

In case before the beginning of active material 6 formation process there is a gap 10 between current-conductive backing 1 (FIG. 3) and the layer of corrosion-resistant porous material 8,—the formation of active material 6 up to filling gap 10 (FIG. 3) takes place without pressure onto the active material.

For manufacturing a negative electrode the obtained positive electrode 9 is disconnected from the positive terminal 3 of the power supply and connected to the negative terminal 5. The same operation of changing polarity is carried out with technological electrode 4. After that electric current is passed in the opposite direction and the process is carried out until electrode potential reaches +0.2 to −0.4 V relative to the cadmium comparison electrode, for reduction of the active material to spongy lead. In this way negative electrode is obtained from the positive one.

The obtained positive electrode with active material layer thickness of 2.5 mm upon testing in a mock-up of a lead-acid storage battery under conditions of multiple charge-discharge cycles, manifested the following dependence of the specific capacity of electrode on the pressure on its active material, see the Table below.

Data of the pressure influence on specific characteristics of electrode are given below.

TABLE

| Electrode No. | Pressure on surface of active material Mpa | Specific power capacity 5-h discharge, 10th cycle, A-h/cm sq. |
|---|---|---|
| 1 | 0.002 | 0.010 |
| 2 | 0.004 | 0.015 |
| 3 | 0.005 | 0.021 |
| 4 | 0.05 | 0.029 |
| 5 | 0.1 | 0.039 |
| 6 | 0.5 | 0.054 |
| 7 | 2.05 | 0.042 |
| 8 | 4.0 | 0.032 |
| 9 | 6.5 | 0.024 |
| 10 | 6.7 | 0.018 |
| 11 | 7.6 | 0.011 |

It is clear from the tabulated data above that high specific power capacity of the electrode and, therefore, high power characteristics of a storage battery with such electrodes can be expected in the range of pressures on the surface of the active material from 0.005 to 6.5 MPa.

Electrodes manufactured using the process described above can have a thickness of the active material up to 5 mm.

Experiments indicated, that with the pressure on the surface of the active material created less than 0.005 MPa there is no necessary compensation of the appearing in it inner stresses, while with the pressure exceeding 6.5 MPa excessive packing of the active material takes place, this face leads to the reduction of its porosity and consequently the size of operative area of the electrode.

Due to the above, the storage batteries with the electrodes manufactured according to the invention, can be used as small-size, traction, stationary, starter batteries. They have superior specific power characteristics, low lead usage and low cost. The manufacturing process of these electrodes is relatively ecologically sound.

Another advantage of electrodes manufactured according to the instant invention is that they are widely used in storage batteries not requiring periodic topping up the electrolyte with distilled water throughout the service life of the battery.

A type D(R20) small-size cylindrical sealed lead-acid storage battery—height 60.5 mm, diameter 34.0 mm employing electrodes manufactured according to the instant invention has the following specifications basing on a 20-hour mode of discharge:

| | |
|---|---|
| Specific power capacity | 34.6 W-hours/kg; |
| Specific lead metal consumption | 15.8 g/W-hour, |
| Service life | 200 cycles at least. |

The above version of embodiment of the invention is only an example and in no way limits the scope of invention. Various modifications and alterations are possible in case they do not deviate from the essence and the scope thereof, as set forth in claims below.

We claim:

1. A process for the manufacture of an electrode for a lead-acid storage battery comprising passing electric current through a current-conductive backing of lead immersed in electrolyte and connected to a positive terminal of a power supply, and oxidizing the lead to form a layer of active material on the surface of said current-conductive backing as a result of electrochemical reaction, said active material consisting essentially of $PbO_2$, wherein said process comprises the following steps:
arranging a current-conductive backing of lead between layers of corrosion-resistant porous material, which during active material formation on the current-conductive backing create pressure on a surface of the formed layer of active material ranging from 0.005 to 6.5 MPa; and carrying out electrochemical treatment until the active material thickness reaches 0.3 mm to 5 mm.

2. A process according to claim 1, comprising arranging the current-conductive backing of lead between the layer of the corrosion-resistant porous material with a gap therebetween, wherein a layer of active material is formed until it contacts the layers of corrosion-resistant porous material, creating pressure on the surface of the formed layer ranging from 0.005 to 6.5 MPa.

3. A process according to claim 1, comprising disconnecting the electrode connected to the positive terminal of power supply and connecting said electrode to a negative terminal of the power supply and passing electric current for reduction of the active material to spongy lead.

4. A process according to claim 3, comprising passing electric current until the power capacity of the electrode reaches a level from +0.2 to −0.4 relative to a cadmium electrode taken for comparison.

5. A process according to claim 1, wherein the corrosion-resistant porous material has a pore size from 0.1 $\mu m$ to 800 $\mu m$.

6. A process according to claim 5, wherein at least one of the layers is made of corrosion-resistant porous material which resiliently deforms upon compression, and the rate of relative deformation upon layer compression is from 0.4 to 95.0%.

7. A process according to claim 6, comprising connecting the layers of corrosion-resistant porous material to form a closed casing.

8. A process according to claim 7, wherein said casing comprises an elastic casing which resiliently deforms upon stretching, and the rate of relative deformation upon stretching the casing is more than 5%.

9. A process according to claim 7, wherein the casing comprises working and stand-by sections, and upon reaching contact the process comprises placing the current-conductive backing in the working section of the casing, and wherein the working section and the stand-by section are connected wherein upon active material formation and increase of layer thickness the working section of the casing increases, while the stand-by section decreases, and the rate of relative deformation upon expansion of the working section exceeds 5%.

10. A process according to claim 9, comprising placing a shock absorber made of resilient corrosion-resistant material in the stand-by section of the casing.

11. A process according to claim 10, comprising using a hollow current-conductive backing.

12. A process according to claim 11, comprising placing a shock absorber made of resilient corrosion-resistant material in the hollow space of the current-conductive backing.

13. A process according to claim 6, wherein a part of the corrosion-resistant porous material layer surface is impermeable to electrolyte for the formation of different thicknesses of the active material layer on the surface of the current-conductive backing.

* * * * *